Patented Mar. 20, 1928.

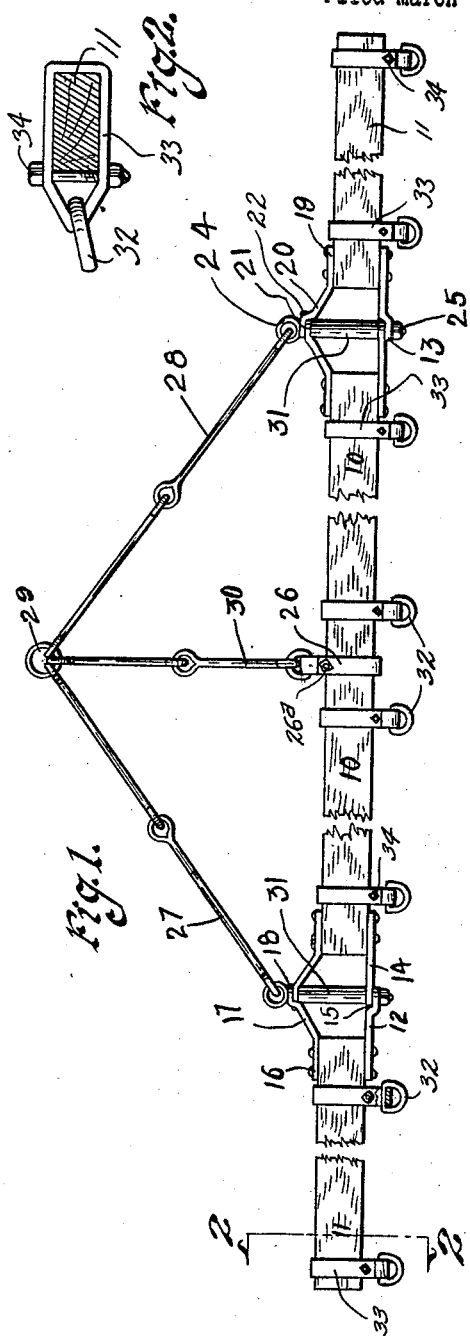

1,663,108

UNITED STATES PATENT OFFICE.

FRANK A. BESSMAN, OF HUBBARD, AND EMIL WARMBIER, OF ALDEN, IOWA.

HINGED-DRAG DRAWBAR.

Application filed March 25, 1926. Serial No. 97,241.

The object of our invention is to provide a hinged drag draw bar having connecting means of simple, durable and inexpensive construction.

More particularly, it is our object to provide a hinged drag draw bar having a central member and one or more end members hinged to the central member by a novel hinge structure in such manner that the end members may be swung upwardly and over the central member, permitting the outer drag sections to be likewise swung up and over the inner drag sections for shortening the structure, so that it can be conveniently taken through gates and the like.

A further object is to provide in such a device a connecting means comprising a band encircling the draw bar and clamped thereto so that it can be adjusted to different positions longitudinally on the draw bar.

With these and other objects in view, our invention consists in the construction, arrangement and combination of the various parts of our device, whereby the objects contemplated are attained, as hereinafter more fully set forth, pointed out in our claim, and illustrated in the accompanying drawings, in which:

Figure 1 is a top or plan view of a hinged drag draw bar with the connecting member illustrated in connection therewith; and embodying our invention.

Figure 2 is a detail sectional view on the line 2—2 of Figure 1.

In the accompanying drawings, we have used the reference numeral 10 to indicate generally the central member of the draw bar. One or more end members 11 may be hinged to the central draw bar member 10. Each hinge comprises a pair of rear members, comprising a flat bar or the like 12 secured to the rear side of one of the members 11 and projecting beyond the end thereof, toward the member 10. The projecting end of the bar 12 has an offset portion 13. A coacting bar 14 is fastened to the rear face of the member 10 and projects beyond the end of the member 10 in line with the bar 12 and to fit just inside of the offset portion 13.

At the lower outer part of the bar 14 is a projecting lug 15, which when the bars 12 and 14 are in alignment with each other stands just below the bar 12, as shown in Figure 2, to prevent any downward tilting of the bar 12, when the pivot pins are in position.

Secured to the front face of each member 11 adjacent to its inner end is a hinge bar 16, having an inclined portion 17 extending inwardly and forwardly and terminating in a portion 18 extending away from the bar 11 in a plane parallel with that of the bar 16.

A hinge bar 19 is secured to the front face of the bar 10 near each end thereof and has a portion 20 inclined forwardly and laterally as shown in Figures 1 and 2 and terminating in a portion 21 inclined away from the bar 10 in a plane parallel with the plane of the bar portion 19.

The portion 21 has on its under side a projecting lug 22, so arranged that when the bars 16 and 19 are in alignment, the lug 22 lies just under the portion 17 in such manner as to prevent the downward tilting of the portions 16 and 17 when the hinge pins are in place.

The offset portion 15, the outer end of the member 14, and the portions 21 and 18 are provided with holes 23, which in the assembled device are in alignment with each other.

An eyebolt pivot pin 24 is extended through the holes 23, as shown in Figure 1, and has a nut 25 on its rear end. The foregoing description is of one type of bar to which my connecting member may be applied.

The connecting member itself comprises a strap iron band 26 extending around the bar 10 and clamped thereon by a bolt 26ª. Jointed rods or the like 27 are connected with the eye of the left-hand eye bolt 24, and the eye of the right-hand eyebolt 24. These jointed rods 27 and 28 converge and are connected with a ring 29 at a point substantially in front of the bar 10. Jointed rods 30 connect the band 26 and the ring 29.

Between the front and rear hinge members, spacer sleeves 31 are mounted on the eyebolts 24 for holding the front and rear portions of the hinges properly spaced apart.

In practical use, our improved hinged drag draw bar has a number of advantages.

It will be understood that harrow sections, not shown, are connected with the bar members 10 and 11 to be drawn behind them. This connection is made by the rings 32 which are connected to the bars 10 and 11 by means of strap-iron bands 33 similar to the band 26. The bands 33 are slidably mounted on the bars 10 and 11 to accommodate harrow sections of different widths and are securely held in any of their adjusted positions by tightening the bolts 34.

Ordinarily one section will be drawn by each drag bar section 11, and two harrow sections will be drawn by the drag bar section 10.

One important advantage of our hinged guide draw bar arises from the fact that the pivotally jointed rods 27 and 28 are connected with the hinge pin eye-bolts 24, and there is thus no connection between the draft device ring 29 and the drag bar sections 11, which might interfere with the swinging movement of the sections 11.

The hitch is therefore not interfered with in any way by the section connections of the draw bar ends.

Another advantage of our structure arises from the use of the bands 33 which may be adjusted to different positions to accommodate harrow sections of various widths. The peculiar construction of the band 33 prevents distortion when the clamping bolt 34 is tightened. The construction just referred to is the V-shaped loop through which the ring 32 extends which allows the sides of the band to be drawn toward each other and yet prevents bending of the band over the edge of the draw bar due to the pull of the bolt 34 when tightened.

Some changes may be made in the various parts of our hinged drag draw bar, and it is our intention to cover by our claim, any modified forms of structure or use of mechanical equivalents, which may be reasonably included within its scope.

We claim as our invention:

A draw bar structure comprising a bar, connecting means on said bar whereby devices may be connected to the bar and drawn thereby, said connecting means comprising a band encircling the bar and engaging three sides thereof, the fourth side of the band being substantially spaced from the fourth side of the bar for providing a substantially V-shaped loop, a clamping bolt extending through the sides of the band and engaging the fourth side of the bar whereby said band may be loosened and moved longitudinally relative to the bar or clamped thereto, the portion of the band extending beyond the bolt serving to prevent distortion of the band when the bolt is tightened.

Des Moines, Iowa, March 9, 1926.

FRANK A. BESSMAN.
EMIL WARMBIER.